Aug. 25, 1953 R. SHAW 2,649,657
DOUGH CUTTER
Filed March 31, 1949
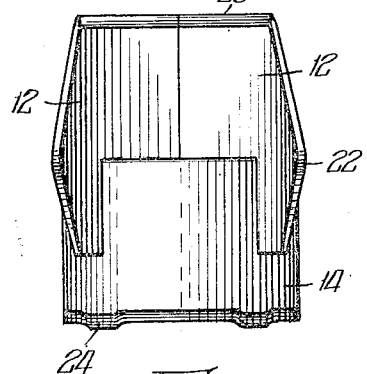
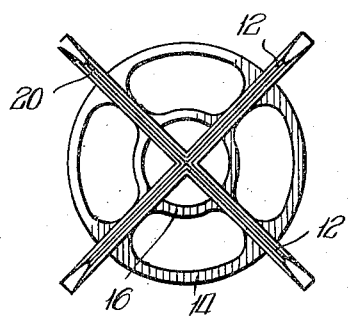
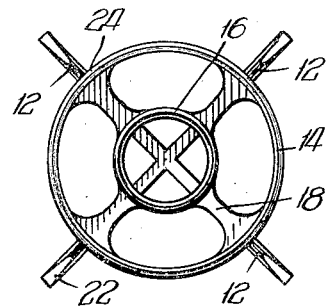
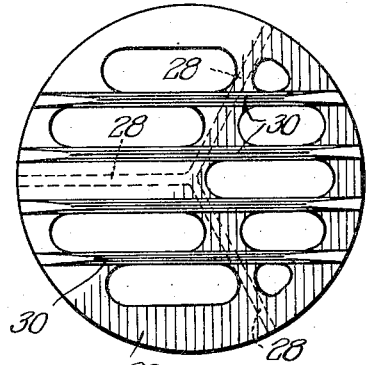
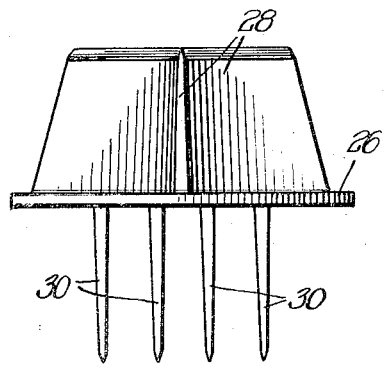
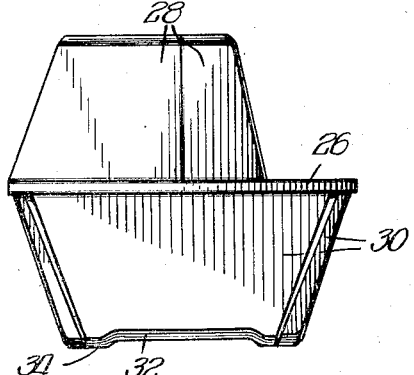
INVENTOR.
Rinda Shaw,
BY Patented Aug. 25, 1953

2,649,657

UNITED STATES PATENT OFFICE 2,649,657

DOUGH CUTTER

Rinda Shaw, Chicago, Ill.

Application March 31, 1949, Serial No. 84,680

1 Claim. (Cl. 30—305)

This invention relates to dough cutters and more particularly to devices for cutting dough in a baking pan prior to baking.

This application is a continuation-in-part of applicant's copending application Serial No. 43,112, filed August 7, 1848, now abandoned.

Various types of rolls are baked in pans having a plurality of cups which tend to hold the dough in shape while being baked. The dough is usually formed in the desired shape before being placed in the cup and where the baked roll is to have lines of cleavage to enable it to be easily broken apart, such as a cloverleaf roll, the dough is formed into a plurality of separate units and placed in the cup. Other shapes of rolls are formed with more lines of cleavage and require more labor in producing them.

It is, therefore, an object of this invention to provide a dough cutter which will greatly reduce the amount of labor and time required to produce rolls of this type.

It is another object to provide a dough cutter that will uniformly cut dough while it is in the cup of a roll pan.

It is a further object to provide a dough cutter that will automatically center itself in the cup of a roll pan.

It is another object to provide a dough cutter that will shape dough in the cup of a pan without the dough adhering to the cutter.

It is a further object to provide a dough cutter that will shape dough in the cup of a pan into the desired number of sections, thereby eliminating the necessity of forming the sections individually.

With these and other objects in view, the invention consists of certain novel features of construction as will be more fully described and particularly pointed out in the specification, drawings and claim appended hereto.

In the drawings, which illustrate embodiments of the invention and wherein like reference characters are used to designate like parts—

Fig. 1 is an elevational view of one form of the invention;

Fig. 2 is a top plan view of the cutter shown in Fig. 1;

Fig. 3 is a bottom plan view of the cutter shown in Fig. 1;

Fig. 4 is an elevational view of a modification of the invention;

Fig. 5 is an elevational view of the cutter shown in Fig. 4 taken 90° to the right of Fig. 4; and Fig. 6 is a bottom plan view of the cutter shown in Fig. 4.

Referring to the drawings, the cutter shown in Figs. 1 to 3 consists of the four blades 12 which are disposed at right angles to each other and are secured to the web 18 which maintains the circular blades 14 and 16 in concentric relation. The base ends of the blades 12 and 14 and 16 are secured in back to back relation and it is apparent that the blades 12 could be secured to the blades 14 and 16 and maintain them in concentric position without the web 18.

These cutters are particularly suited for use in roll pans which have cups that taper inwardly from top to bottom. The blades 12 are correspondingly tapered outwardly from their cutting edges 20 to a point in the plane with the base portions of blades 14 and 16. From this point the portions 22 of the blades 12 which extend outwardly beyond the blade 14 taper inwardly at a corresponding angle as they extend down the outside of blade 14. The portions 22 do not extend all the way down the blade 14 but terminate at a point approximating the height of the dough in a cup which is to be cut.

The cutting edges of blades 14 and 16 are non-linear and are provided with the projecting portions 24 which extend beyond the remainder of the blade edge so that when the blades are moved into the dough in a cup the projecting portions 24 engage the bottom of the pan and prevent the remainder of the cutting edges from cutting all the way through the dough. Since the dough is not completely severed and still is connected at the bottom, the tendency of sections of dough to adhere to the cutter blades and be lifted out when the cutter is removed is minimized. When cutter blades 14 and 16 are being used to cut the dough, the blades 12 are conveniently used as a handle and the side portions 22 thereof engage the side wall of the cup and center the blades 14 and 16 with respect to the cup. The cutting blade 14 is spaced inwardly from the side wall of the cup so that the dough is divided into three segments with only two cutting blades.

The blades 12 are used to cut a roll having four sections and the cutting blade 14 is then used as a handle. The sides of blades 12 being tapered, the blades are automatically centered in the cup so that the resulting lines in the dough intersect at the center of the cup.

The embodiment of the invention shown in Figs. 4, 5 and 6 comprises a web or base member 26 having one set of blades 28 on one side and a second set 30 on the other side. The blades 28 are arranged 120° apart and the inner edges are joined on a line coinciding with the axis of the circular web 26. The diameter of web 26 corresponds to that of the upper rim of a cup in a roll pan and the outer edges of the blades taper inwardly from top to bottom to conform to the slope of the side wall of the cup. When the blades are inserted in a cup, the line of intersection of the blades is automatically aligned with the axis of the cup.

The blades 30 are in spaced parallel relation and preferably disposed symmetrically on each side of a diameter of the web 26. The lateral edges of the blades are tapered inwardly from the web to their cutting edges 32 conforming to the slope of a cup side wall, so that when these blades are inserted in a cup they are automatically centered by the lateral edges thereof engaging the side wall of the cup. With the blades centered in the cup, five dough segments may be formed by the four blades. The cutting edges of the blades are provided with projections 34 so that the dough is cut all the way through only at the points of those projections. The remainder of the dough at the bottom is not separated and, consequently, the dough tends to hold together rather than adhere to the cutter blades when the cutter is removed from the cup. If the cup is deeper than the blades, the web 26 will assist in centering the blades whereas, in a shallower cup, the contour of the blades alone will center them.

The blades of the cutters on one side are disposed transversely of the blades on the other side so that when either side is used as a handle pressure is exerted across the set of blades being used for cutting with the result that a clean even cut is easily made.

The cutters may be made of plastic, metal, or other suitable material and may be made as an integral unit or in several pieces secured together. The web formation of the base members 18 and 26 effects an economy in material and eliminates the possibility of air being trapped in dough or a partial vacuum being formed in the cup during cutting operations.

It is to be understood that this invention is not to be limited by the exact embodiments shown, which are merely by way of illustration and not limitation, as various other forms of the device will, of course, be apparent to those skilled in the art without departing from the spirit of the invention or the scope of the claim.

I claim:

A dough cutter comprising a base member, a set of parallel, spaced blades projecting perpendicularly from said base member and having cutting edges at their outer extremities, the lateral edges of said blades tapering inwardly toward said cutting edges so that said blades can be snugly received within a container having the shape of a truncated cone, the outer extremities of said blades being undercut intermediate the lateral edges thereof forming downwardly extending cutting projections at the outer sides of said cutting edges.

RINDA SHAW.

References Cited in the file of this patent

UNITED STATES PATENTS

| Number | Name | Date |
|---|---|---|
| 275,136 | Butler | Apr. 3, 1883 |
| 384,973 | Hawes | June 26, 1888 |
| 496,809 | Allen | May 2, 1893 |
| 564,489 | Weidner | July 21, 1896 |
| 1,126,134 | Van Bochove | Jan. 26, 1915 |
| 1,800,315 | Olson et al. | Apr. 14, 1931 |
| 2,072,793 | Brennan | Mar. 2, 1937 |
| 2,075,699 | Brennan | Mar. 30, 1937 |
| 2,206,316 | Bartholomew | July 2, 1940 |
| 2,249,399 | Sajnaj | July 15, 1941 |
| 2,279,833 | Madan | Apr. 14, 1942 |